(12) United States Patent
Kato et al.

(10) Patent No.: US 7,379,272 B2
(45) Date of Patent: May 27, 2008

(54) DISK DRIVE INTERNAL LATCH ASSEMBLY WITH MOVEMENT RESTRICTION MEMBER TO GENERATE OPPOSING ROTATION MOMENTS ON SHAFT OPPOSING SIDES

(75) Inventors: Yasuhiko Kato, Kawasaki (JP); Yoshihiro Arikawa, Kawasaki (JP); Kazunori Akama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 347 days.

(21) Appl. No.: 11/183,081

(22) Filed: Jul. 15, 2005

(65) Prior Publication Data
US 2006/0215328 A1    Sep. 28, 2006

(30) Foreign Application Priority Data
Mar. 24, 2005    (JP) ............................. 2005-087330

(51) Int. Cl.
*G11B 21/22* (2006.01)
(52) U.S. Cl. .................................... 360/256.4
(58) Field of Classification Search ............. 360/256.4
See application file for complete search history.

(56) References Cited

U.S. PATENT DOCUMENTS 6,028,746 A    2/2000    Matsumura
6,163,440 A *  12/2000   Takahashi et al. ....... 360/256.4
6,327,119 B1   12/2001   Barina et al.
6,507,461 B1   1/2003    Kimura et al.
2003/0086210 A1* 5/2003  Miyajima ................ 360/256.4
2003/0107846 A1* 6/2003  Shikii ......................... 360/256

FOREIGN PATENT DOCUMENTS

| JP | 11-016303 | 1/1999 |
| JP | 2002-542557 | 12/2002 |
| WO | WO00/74056 | 12/2000 |

* cited by examiner

*Primary Examiner*—Craig A. Renner
(74) *Attorney, Agent, or Firm*—Greer, Burns & Crain, Ltd.

(57) ABSTRACT

A lever and a weight are supported on a first shaft for swinging movement in a latch mechanism. The weight gets closer to a head actuator member based on swinging movement in a first direction. A restriction member restricts the swinging movement of the weight in a second direction opposite to the first direction. A swinging member is contacted with the lever swinging around the first shaft so that the swinging member gets into a predetermined path of the head actuator member through the swinging movement around the second shaft. The disk drive always allows the weight, the lever and the swinging member to start swinging from corresponding inoperative positions, even if the disk drive suffers from a sequential driving force in opposite directions due to impact. A head slider at the tip end of the head actuator member is reliably prevented from colliding against the disk.

2 Claims, 5 Drawing Sheets

DISK DRIVE INTERNAL LATCH ASSEMBLY WITH MOVEMENT RESTRICTION MEMBER TO GENERATE OPPOSING ROTATION MOMENTS ON SHAFT OPPOSING SIDES

BACKGROUND OF THE INVENTION

1. Field of the Invention

The present invention relates to a disk drive such as a hard disk drive (HDD). In particular, the invention relates to a disk drive comprising a disk and a ramp member located at a location outside the disk.

2. Description of the Prior Art

A head actuator is incorporated in a hard disk drive, for example. The head actuator includes an actuator arm allowed to swing around a support shaft along a predetermined path. When the actuator arm furthest swings in a normal direction outward in the radial direction of the magnetic recording disk, the actuator arm is positioned at the inoperative position. The tip end of the actuator arm is received on a ramp member. When the actuator arm swings from the inoperative position in the reverse direction opposite to the normal direction, the tip end of the actuator arm is released from support of the ramp member.

A so-called latch mechanism is often incorporated in the hard disk drive. The latch mechanism includes a lever supported on a first shaft for swinging movement. A weight is coupled to the lever. The weight is thus supported on the first shaft for swinging movement. When the lever swings around the first shaft from a neutral position based on the inertial force of the weight, the lever is contacted with a swinging member. Contact with the lever swinging in a first direction, or contact with the lever swinging in a second direction opposite to the first direction causes the swinging movement of the swinging member around a second shaft from an inoperative position. The swinging member is thus allowed to get into the predetermined path of movement of the actuator arm.

When impact of a fall serves to induce a sequential driving force in the normal and reverse directions in the hard disk drive, for example, the lever is forced to swing from the neutral position around the first shaft in the second direction based on the driving force in the normal direction. The swinging member swings around the second shaft from the inoperative position. The swinging member is thus allowed to get into the path of movement of the actuator arm. The actuator arm is held at the inoperative position. The actuator arm thereafter starts swinging back from the inoperative position based on the driving force in the reverse direction.

In this case, since the lever and the swinging member have already been positioned off the neutral and inoperative positions, respectively, the swinging movement of the lever and the swinging member cannot start from the neutral and inoperative positions. It takes a long way for the lever and the swinging member to reach the path of movement of the actuator arm. The actuator arm thus passes by the swinging member before the swinging member gets into the path of movement of the actuator arm. The swinging member cannot restrict the swinging movement of the actuator arm. The actuator arm is in this manner released from the support of the ramp member. A head slider at the tip end of the actuator arm thus collides against the surface of the magnetic recording disk. There is a possibility that the head slider gets damaged.

SUMMARY OF THE INVENTION

It is accordingly an object of the present invention to provide a disk drive capable of reliably holding the swinging movement of the head actuator member.

According to the present invention, there is provided a disk drive comprising: a head slider opposed to a disk; a ramp member located at a position outside the disk; a head actuator member supporting the head slider, said head actuator member following a predetermined path when the head actuator member swings around a support shaft so as to get released from the ramp member; a lever supported on a first shaft for swinging movement; a weight supported on the first shaft for connection to the lever, said weight getting closer to the head actuator member based on swinging movement around the first shaft in a first direction; a restriction member designed to restrict the swinging movement of the weight around the first shaft in a second direction opposite to the first direction; and a swinging member supported on a second shaft for swinging movement, said swinging member being contacted with the lever swinging around the first shaft so that the swinging member gets into the predetermined path of the head actuator member through the swinging movement around the second shaft.

When the disk stands still, the head actuator member is held at an inoperative position. The weight, the lever and the swinging member are also held at corresponding inoperative positions, respectively. If impact serves to generate a driving force for driving the head actuator member for swinging movement around the support shaft to get released from the support of the ramp member, the weight swings in the first direction from the inoperative position around the first shaft. The weight moves toward the head actuator member. This swinging movement of the weight causes the lever to swing around the first shaft from the inoperative position. The swinging movement of the lever causes the swinging member to move from the inoperative position so as to get into the predetermined path of movement of the head actuator member. The swinging member thus restricts the swinging movement of the head actuator member.

On the other hand, if impact serves to generate a driving force in a direction opposite to the direction of the aforementioned driving force, the restriction member prevents the weight from swinging in a second direction opposite to the first direction. The weight is held at the inoperative position. The lever and the swinging member are also held at the corresponding inoperative positions. The head actuator member is held at the inoperative position.

The disk drive of the type always allows the weight, the lever and the swinging member to start swinging from the corresponding inoperative positions, even if the disk drive suffers from a sequential driving force in opposite directions. The swinging movement of the head actuator member is thus reliably restricted. The head slider is prevented from colliding against the disk. The head slider is reliably prevented from suffering from damages. The disk drive of the type may allow the restriction member to restrict the swinging movement of the lever in the second direction around the first shaft.

The restriction member may comprise first and second contact surfaces designed to simultaneously generate moments in opposite directions around the second shaft based on contact of the lever swinging around the first shaft in the second direction. Simultaneous generation of the moments in the opposite directions surely enables restriction of the swinging movement of the lever in the second direction around the first shaft. The restriction member may also serve as the swinging member.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
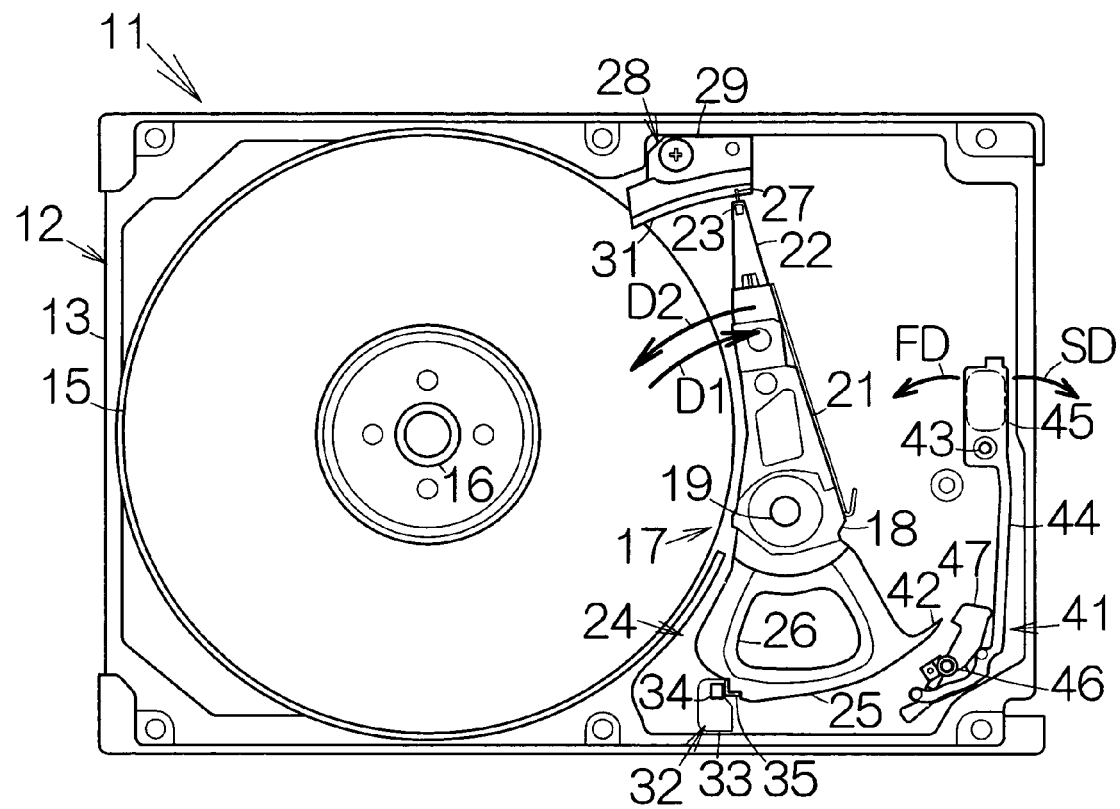
FIG. 1 is a plan view schematically illustrating the inner structure of a hard disk drive, HDD, as an example of a disk drive according to an embodiment of the present invention.

FIG. 1 schematically illustrates the inner structure of a hard disk drive, HDD, 11 as an example of a recording disk drive or storage device according to an embodiment of the present invention. The hard disk rive 11 includes a box-shaped enclosure 12. The enclosure 12 includes a boxed-shaped base 13 defining an inner space of a flat parallelepiped, for example. The base 13 may be made of a metallic material such as aluminum, for example. Molding process may be employed to form the base 13.

A cover, not shown, is coupled to the base 13. The cover serves to close the opening of the inner space within the base 13. Pressing process may be employed to form the cover out of a plate material, for example. The plate material may be made of a metallic plate such as an aluminum plate, for example. The plate material may be a layered material, for example.

At least one magnetic recording disk 15 as a recording media is incorporated within the inner space of the base 13. The magnetic recording disk or disks 15 is mounted on the driving shaft of a spindle motor 16. The spindle motor 16 drives the magnetic recording disk or disks 15 at a higher revolution speed such as 5,400 rpm, 7,200 rpm, 10,000 rpm, 15,000 rpm, or the like.

A head actuator 17 is also incorporated within the inner space of the base 13. The head actuator 17 includes an actuator block 18. The actuator block 18 is supported on a vertical support shaft 19 for relative rotation. Actuator arms 21 are defined in the actuator block 18. The actuator arms 21 are designed to extend in a horizontal direction from the vertical support shaft 19. The actuator block 18 may be made of aluminum, for example. Extrusion molding process may be employed to form the actuator block 18, for example.

A head suspension 22 is designed to extend forward from the corresponding tip end of the individual actuator arm 21. A gimbal spring, not shown, is connected to the tip end of the individual head suspension 22. A flying head slider 23 is fixed on the surface of the gimbal spring. The gimbal spring allows the flying head slider 23 to change its attitude relative to the head suspension 22.

An electromagnetic transducer, not shown, is mounted on the flying head slider 23. The electromagnetic transducer may include a write element and a read element. The write element may include a thin film magnetic head designed to write magnetic bit data into the magnetic recording disk 15 by utilizing a magnetic field induced at a thin film coil pattern. The read element may include a giant magnetoresistive (GMR) element or a tunnel-junction magnetoresistive (TMR) element designed to discriminate magnetic bit data on the magnetic recording disk 15 by utilizing variation in the electric resistance of a spin valve film or a tunnel-junction film, for example.

When the magnetic recording disk 15 rotates, the flying head slider 23 is allowed to receive airflow generated along the rotating magnetic recording disk 15. The airflow serves to generate positive pressure or a lift and negative pressure on the flying head slider 23. The flying head slider 23 is thus allowed to keep flying above the surface of the magnetic recording disk 15 during the rotation of the magnetic recording disk 15 at a higher stability established by the balance between the urging force of the head suspension 22 and the combination of the lift and the negative pressure.

When the actuator arm 21 is driven to swing about the vertical support shaft 19 during the flight of the flying head slider 23, the flying head slider 23 is allowed to move along the radial direction of the magnetic recording disk 15. This radial movement allows the electromagnetic transducer on the flying head slider 23 to cross the data zone between the innermost recording track and the outermost recording track. The electromagnetic transducer on the flying head slider 23 can thus be positioned right above a target recording track on the magnetic recording disk 15.

A voice coil motor, VCM, 24 is coupled to the actuator block 18. A core member 25 is formed in the actuator block 18 so as to extend in a horizontal direction from the vertical support shaft 19. The core member 25 may be integral to the actuator block 18. A coil 26 of the voice coil motor 24 is wound around the core member 25. The core member 25 is opposed to a permanent magnet, not shown, stationarily fixed to the base 13 or the like. When magnetic field is generated in the coil 26 in response to the supply of electric power, the actuator block 18 is allowed to rotate around the support shaft 19, namely, the actuator arms 21 are caused to swing.

A load member or load tab 27 is attached to the front or tip end of the head suspension 22 so as to further extend in the forward direction from the head suspension 22. The load tabs 27 are allowed to move in the radial direction of the magnetic recording disk 15 based on the swinging movement of the actuator arms 21. A ramp member 28 is located outside the magnetic recording disk 15 on the path of movement of the load tabs 27. The load tabs 27 are received on the ramp member 28.

The ramp member 28 includes an attachment base 29 screwed on the bottom plate of the base 13 at a location outside the magnetic recording disk 15, for example. The attachment base 29 includes ramp bodies 31 extending from the attachment base 29 along horizontal planes toward the vertical support shaft 19 of the head actuator 17. The ramp bodies 31 may be integral to the attachment base 29 based on molding, for example. The tip end of the ramp body 31 is opposed to the non-data zone outside the outermost recording track on the corresponding surface of the magnetic recording disk 15. The combination of the load tab 27 and the ramp member 28 establishes a so-called load/unload mechanism. The ramp member 28 may be made of a hard plastic material, for example.

A retention mechanism 32 is related to the head actuator 17. The retention mechanism 32 includes a permanent magnet 34 held in an attachment member 33. A metallic piece 35 is opposed to the permanent magnet 34 in the retention mechanism 32. The attachment member 33 is made of an elastic resin material such as rubber, for example. The attachment member 33 is fixed to the base 13, for example. The metallic piece 35 is fixed to the core member 25. The magnetic field of the permanent magnet 34 acts on the metallic piece 35. The metallic piece 35 is thus drawn to the permanent magnet 34.

As is apparent from FIG. 1, when the actuator arms 21 swing furthest in a normal or clockwise direction D1, the metallic piece 35 is received on the permanent magnet 34. The attraction of the permanent magnet 34 serves to keep the load tabs 27 on the ramp member 28. The actuator arms 21 are accordingly kept in an inoperative position. When the actuator arms 21 swing from the inoperative position in the reverse or counterclockwise direction D2 opposite to the normal direction D1, the load tabs 27 get released from the support of the ramp member 28.

A restriction mechanism or latch mechanism 41 is also related to the head actuator 17. The latch mechanism 41 includes a protrusion 42 formed on the core member 25. The protrusion 42 extends from the core member 25 along an imaginary circle described around the axis of the support shaft 19. The protrusion 42 may be integral to the coil member 25 based on molding. The protrusion 42 is allowed to move along a predetermined path on the aforementioned imaginary circle based on the rotation of the actuator block 18, namely the swinging movement of the core member 25.

The latch mechanism 41 includes a plate-shaped lever 44 supported on a first shaft 43 for swinging movement. The first shaft 43 stands upright from the base 13. A weight 45 is coupled to the lever 44. The weight 45 is thus supported on the first shaft 43 for swinging movement, so that the lever 44 is allowed to swing around the first shaft 43 based on the inertial force of the weight 45. The lever 44 and the weight 45 may be made of a metallic material such as a stainless steel, for example.

The lever 44 and the weight 45 are allowed to swing around the first shaft 43 in the a first direction FD from the standard position. On the other hand, the lever 44 and the weight 45 are prevented from swinging around the first shaft 43 in a second direction SD opposite to the first direction FD from the standard position, as described later in detail. The first direction FD is set in a direction similar to the aforementioned reverse direction D2. The second direction SD is likewise set in a direction similar to the normal direction D1.

A swinging member 47 is related to the lever 44. The swinging member 47 is supported on a second shaft 46 for swinging movement. The second shaft 46 stands upright from the base 13. The swinging member 47 is allowed to get into the path of movement of the protrusion 42 based on the swinging movement around the second shaft 46 in response to the contact with the lever 44 swinging in the first direction FD around the first shaft 43. The swinging member 47 may be made of a resin material, for example.

Figure 2:
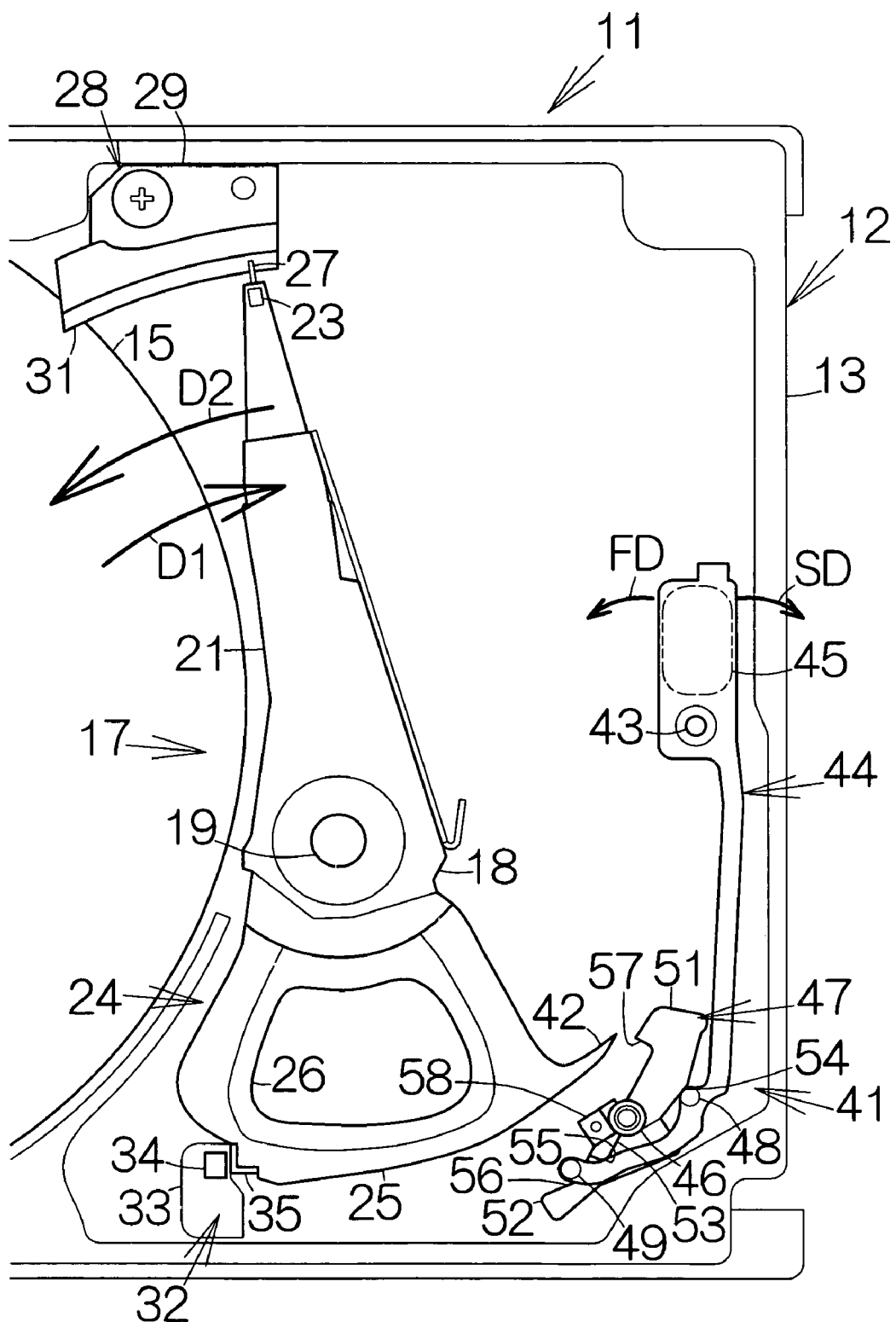
FIG. 2 is an enlarged partial plan view of the hard disk drive for schematically illustrating the structure of a latch mechanism.

As shown in FIG. 2, first and second contact pieces 48, 49 are formed near the tip end of the lever 44. The first and second contact pieces 48, 49 protrude from the back surface of the lever 44 toward the bottom plate of the base 13. The second contact piece 49 may be located closest to the tip end of the lever 44. In this case, the first contact piece 48 may be distanced away from tip end of the lever 44, namely the second contact piece 49. The first and second contact pieces 48, 49 may be formed in a columnar shape, for example. The swinging member 47 is located in a space between the first and second contact pieces 48, 49.

Figure 3:
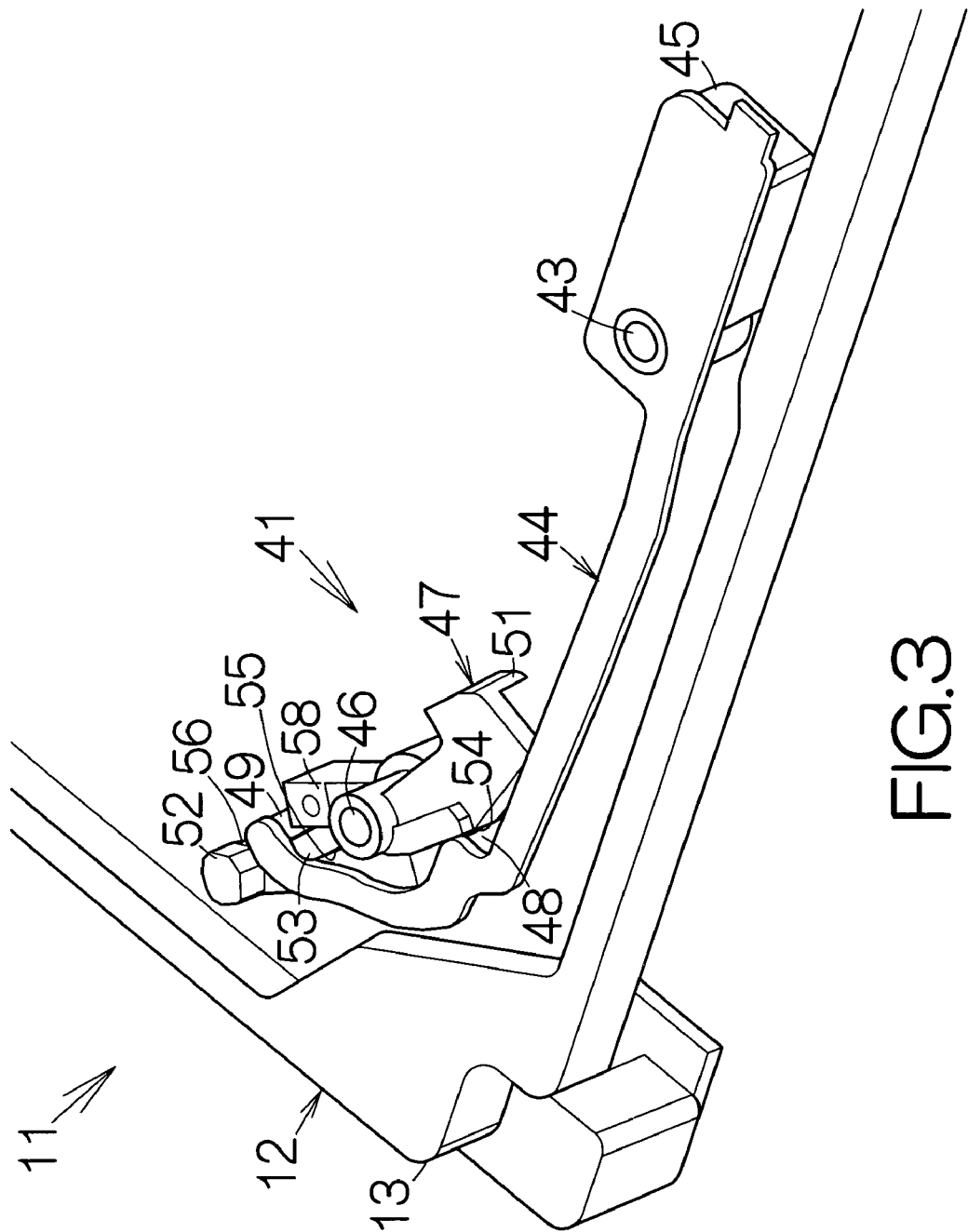
FIG. 3 is an enlarged partial plan view of the hard disk drive schematically illustrating the structure of the latch mechanism.

The swinging member 47 includes first and second swinging pieces 51, 52 extending in opposite directions from the second shaft 46. A protrusion 53 is formed on the upper surface of the second swinging piece 52. The first and second swinging pieces 51, 52 and the protrusion 53 are integrally formed in a one-piece member. Referring also to FIG. 3, the swinging piece 51 is allowed to contact a first contact surface 54 on the side surface thereof with the first contact piece 48. The protrusion 53 is allowed to contact a second contact surface 55 on the side surface thereof with the lever 44. The second swinging piece 52 is allowed to contact a third contact surface 56 on the side surface thereof with the second contact piece 49.

A receiving hole 57 is defined in the first swinging piece 51. The receiving hole 57 is designed to receive the protrusion 42 when the first swinging piece 51 gets into the path of movement of the protrusion 42. A magnetic or metallic chip 58 is attached to the second swinging piece 52. The metallic chip 58 is drawn to the voice coil motor 24 based on the magnetic field acting from the permanent magnet of the voice coil motor 24. The attraction acting on the metallic piece 58 serves to hold the first swinging piece 51 at a retreat position distanced backward from the path of movement of the protrusion 42.

Now, assume that the magnetic recording disk or disks 15 stops rotating. When read/write operation has been completed during the rotation of the magnetic recording disk or disks 15, the voice coil motor 24 drives the actuator block 18 around the vertical support shaft 19 in the normal direction D1. The actuator arms 21 and the head suspensions 22 are driven to swing outward in the radial direction of the magnetic recording disk or disks 15. When the flying head sliders 23 get opposed to the non-data zones or landing zones outside the outermost recording tracks, the load tabs 27 are contacted with the corresponding ramp bodies 31. A further swinging movement of the actuator arms 21 allows the load tabs 27 to continuously climb up the slopes on the ramp bodies 31. The load tabs 27 get remoter from the corresponding surfaces of the magnetic recording disk or disks 15. A subsequent swinging movement of the actuator arms 21 in the normal direction D1 allows the load tabs 27 to slide on the corresponding ramp bodies 31, namely on the ramp member 28. When the load tabs 27 reach the farthest position outside the magnetic recording disk or disks 15, the metallic piece 35 on the core member 25 is received on the permanent magnet 34. The load tabs 27 are in this manner positioned on the ramp member 28. The actuator arms 21 are thus positioned at the inoperative position. The magnetic recording disk or disks 15 then stops rotating. Since the load tabs 27 are reliably held on the ramp member 28, the flying head sliders 23 are prevented from colliding against the magnetic recording disk or disks 15 even without any airflow acting on the flying head sliders 23. The flying head sliders 23 are thus effectively prevented from any attachment to a lubricant agent covering over the surfaces of the magnetic recording disk or disks 15.

When the hard disk drive 11 receives instructions to read or write magnetic information, the magnetic recording disk or disks 15 starts rotating. The voice coil motor 24 drives the actuator arms 21 around the support shaft 19 in the reverse direction D2 after the rotation of the magnetic recording disk or disks 15 has entered the steady condition. The actuator arms 21 and the head suspensions 22 move toward the rotation axis of the magnetic recording disk or disks 15. The load tabs 27 are allowed to slide on the corresponding ramp bodies 31. A further swinging movement of the actuator arms 21 causes the load tabs 27 to move downward along the slopes on the corresponding ramp bodies 31.

During the downward movement of the load tabs 27 along the slopes on the corresponding ramp bodies 31, the flying head sliders 23 get opposed to the corresponding surfaces of the magnetic recording disk or disks 15. Airflow generated along the surface of the magnetic recording disk 15 induces a lift on the flying head slider 23. A further swinging movement of the actuator arms 21 allows the load tabs 27 to take off from the slopes on the corresponding ramp bodies 31, namely from the ramp member 28. Since the magnetic recording disk or disks 15 rotates in the steady condition, the flying head sliders 23 are allowed to fly above the surfaces of the magnetic recording disk or disks 15 without a support from the ramp member 28. The actuator arms 21 and the core member 25 are allowed to move along the predetermined path.

As shown in FIG. 2, when the magnetic recording disk or disks 15 stands still, the metallic piece 35 of the head actuator 17 is received on the attachment member 33 based on the attraction from the permanent magnet 34. The actuator arms 21 are in this manner held at the inoperative position. Here, assume that impact acting on the base 13 serves to drive the hard disk drive 11 in the reverse direction D2. The inertial force causes the actuator arms 21 to swing in the reverse direction D2 from the inoperative position around the vertical support shaft 19 regardless of the attraction from the permanent magnet 34. The core member 25 is caused to swing around the vertical support shaft 19. The load tabs 27 slide on the corresponding ramp bodies 31 toward the corresponding surfaces of the magnetic recording disk or disks 15.

Figure 4:
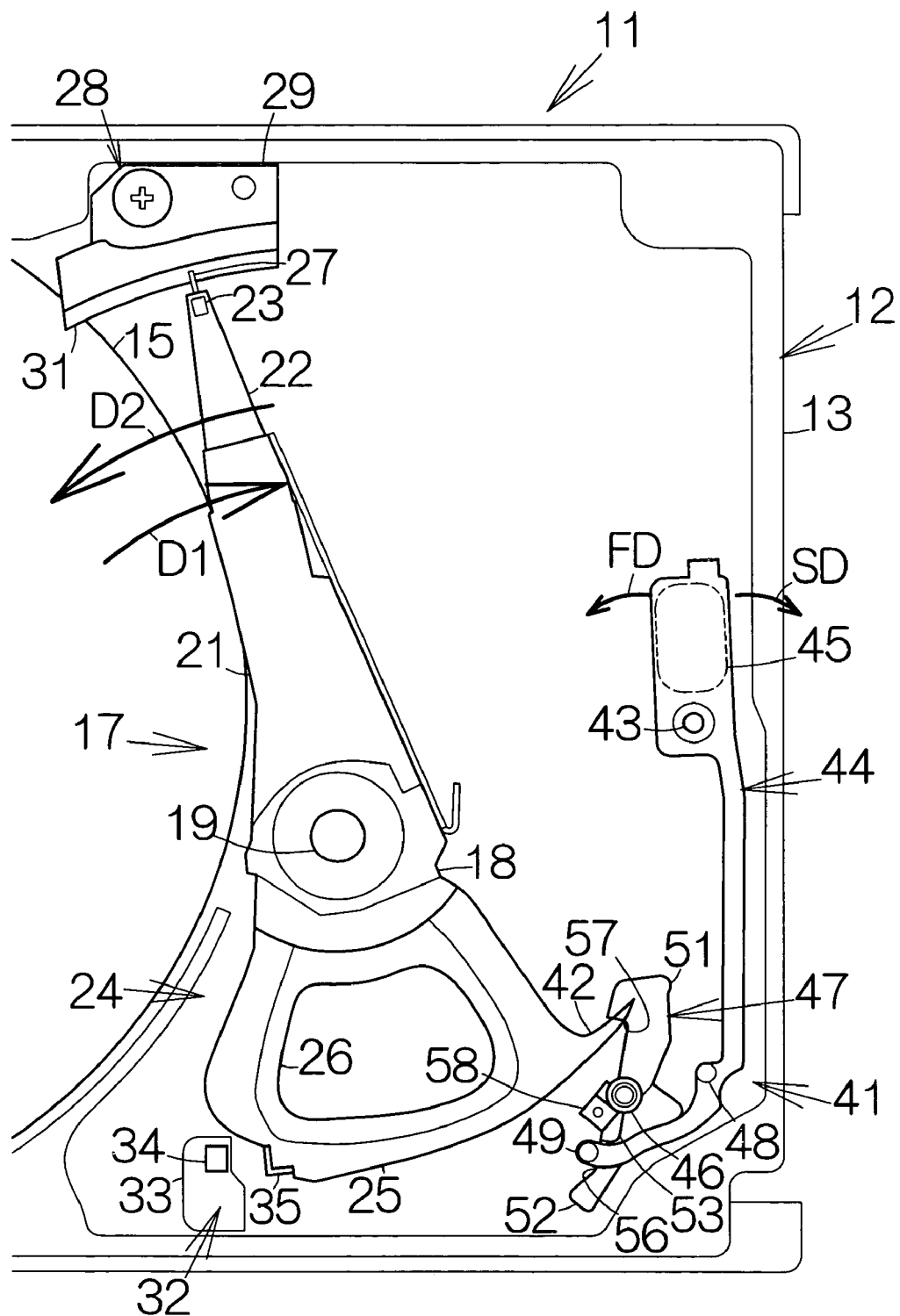
FIG. 4 is an enlarged partial plan view of the hard disk drive for schematically illustrating actuator arms restricted to an inoperative position.

As shown in FIG. 4, the inertial force causes the weight 45 to move toward the actuator block 18 based on the swinging movement around the first shaft 43 in the first direction FD. The swinging movement of the weight 45 causes the swinging movement of the lever 44 from the standard position around the first shaft 43. The lever 44 gets distanced from the actuator block 18 based on the swinging movement around the first shaft 43. The second contact piece 49 of the lever 44 contacts the third contact surface 56 with the second swinging piece 52.

The contact of the second contact piece 49 with the lever 44 enables the swinging movement of the second swinging piece 52 from the inoperative position around the second shaft 46. The swinging movement of the second swinging piece 52 causes the first swinging piece 51 to get into the path of movement of the protrusion 42 based on the swinging movement around the second shaft 46. The protrusion 42 is in this manner received in the receiving hole 57 formed in the first swinging piece 51. The swinging movement of the actuator arms 21 can be restricted. The movement of the load tabs 27 toward the magnetic recording disk or disks 15 is restrained on the corresponding ramp bodies 31. The flying head slider 23 is prevented from colliding against the magnetic recording disk 15. The flying head slider 23 is reliably prevented from damages.

Next, assume that impact acting on the base 13 serves to drive the hard disk drive 11 in the normal direction D1. As shown in FIG. 2, the metallic piece 35 of the head actuator 17 is received on the attachment member 33 when the actuator arms 21 are positioned at the inoperative position. Even if the driving force is generated in the normal direction D1, the attachment member 33 receives the driving force. The actuator arms 21 are prevented from the swinging movement regardless of the impact. The actuator arms 21 are thus held at the inoperative position.

In this case, the weight 45 and the lever 45 receive the driving force in the second direction SD around the first shaft 43. The lever 44 contacts the first contact piece 48 with the first contact surface 54 of the swinging member 47. The lever 44 is also contacted with the second contact surface 55 of the protrusion 53. As a result, moments are simultaneously generated in opposite directions around the second shaft 46 in the swinging member 47. The swinging member 47 is in this manner prevented from rotating or swinging. The weight 45 and the lever 44 are both prevented from swinging in the second direction SD around the first shaft 43. The lever 44 and the swinging member 47 are thus held at the standard position. Here, the swinging member 47 also functions as a restriction member according to the present invention.

The actuator arms 21 are always allowed to start swinging from the inoperative position in the hard disk drive 11 even if impact serves to sequentially drive the hard disk drive 11 in the normal and reverse directions D1, D2. The lever 44 and the swinging member 47 are both likewise allowed to start swinging from the standard position in the latch mechanism 41. The swinging movement of the actuator arms 21 is reliably restricted. The load tabs 27 are thus only allowed to move on the ramp member 28. The flying head slider 23 is in this manner prevented from colliding against the magnetic recording disk 15. The flying head slider 23 is reliably prevented from suffering from damages.

The swinging member fails to include the protrusion 58 in a conventional latch mechanism. In this case, if the hard disk drive 11 suffers from a sequential driving force in the normal and reverse directions D1, D2, the latch mechanism allows the lever to start swinging from the standard position in the second direction SD around the first shaft based on the driving force in the normal direction D1. Since the lever is contacted with the first contact surface, the first swinging piece swings around the second shaft. The first swinging piece gets into the path of movement of the protrusion. The actuator arm subsequently starts swinging from the inoperative position based on the driving force in the reverse direction D2. In this case, since the lever and the first swinging piece are positioned off the standard position, the lever and the swinging member cannot start swinging from the standard position. The lever and the first swinging piece suffer from a long way to go across the standard position. The protrusion thus passes by the swinging member well before the swinging member gets into the path of movement of the core member 25. The first swinging piece cannot receive the protrusion in the receiving hole of the first swinging piece. The actuator arms easily get released from the support of the ramp member. There is a possibility that the flying head slider gets damaged because of collision against the corresponding surfaces of the magnetic recording disk 15.

Figure 5:
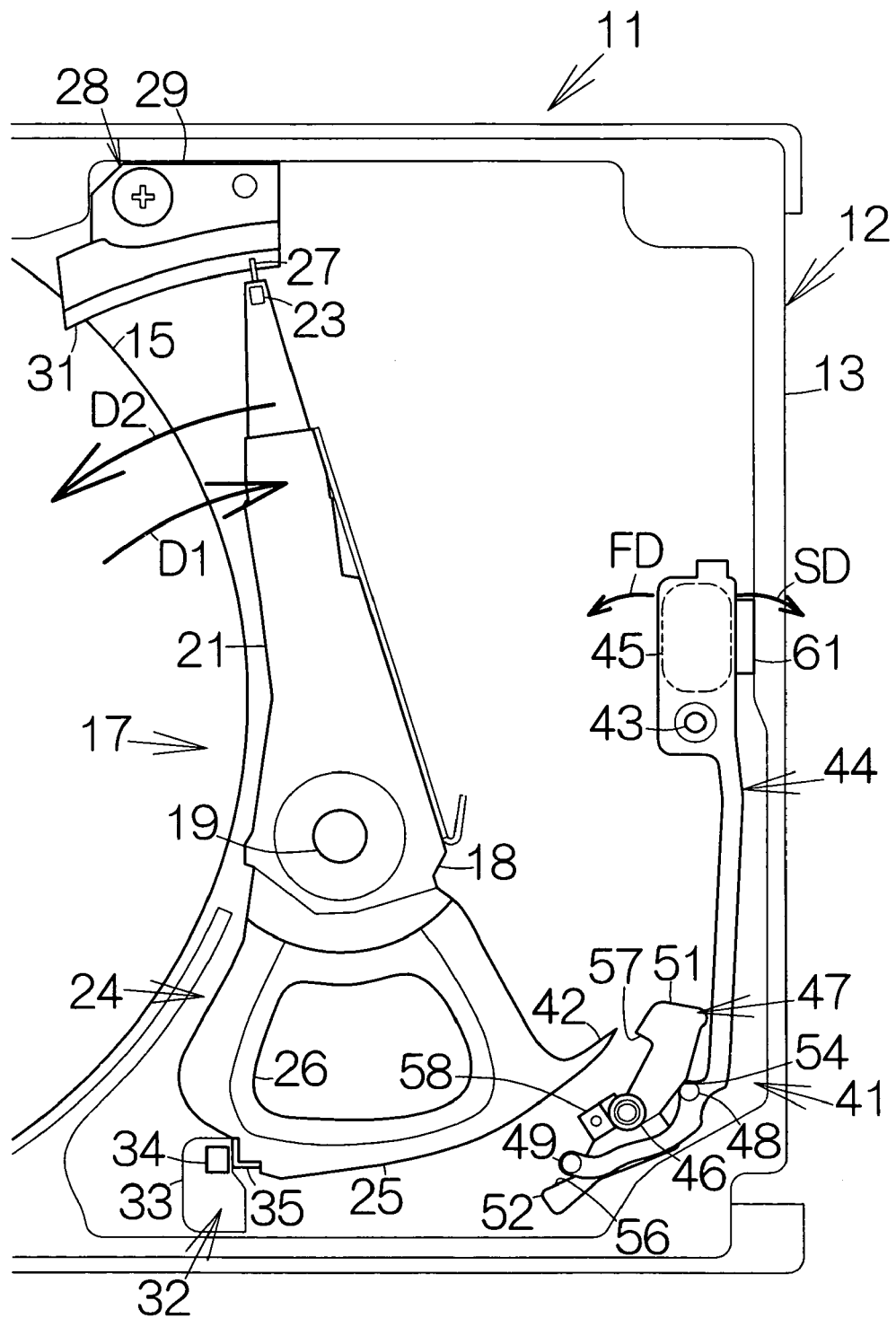
FIG. 5 is an enlarged partial plan view of the hard disk drive for schematically illustrating the structure of the latch mechanism and a restriction member.

As shown in FIG. 5, a restriction member 61 may alternatively be incorporated in the hard disk drive 11 instead of the protrusion 53. The restriction member 61 is interposed between the lever 44 and the side or peripheral wall of the base 13 at a position near the weight 45. When the lever 44 is contacted with the restriction member 61, the lever 44 is positioned at the standard position. The restriction member 61 may be made of a metallic material, an elastic resin material, or the like, for example. The restriction member 61 may be integral to the side wall of the base 13. Alternatively, the restriction member 61 may be integral to the lever 44.

The restriction member 61 serves to prevent the lever 44 or the weight 45 from swinging in the second direction SD around the first shaft 43 in the hard disk drive 11 of the type. The operation of the latch mechanism 41 is surely avoided even if the driving force is generated in the normal direction D1. A sequential driving force in the reverse direction D2 cannot release the actuator arms 21 from the restriction to the swinging movement. On the other hand, the lever 44 is allowed to swing in the first direction FD around the first shaft 43. As described above, the latch mechanism 41 surely operates even if a driving force is generated in the reverse direction D2, in the manner as described above.

The present invention may be applied to a recording disk drive, such as the aforementioned hard disk drive 11, a magneto-optical disk drive employing a magneto-optical disk in combination with a magnetic head mounted on a head slider, an optical disk drive employing an optical disk in combination with an optical element mounted on a head slider, and the like.

What is claimed is:

1. A disk drive comprising:
   a head slider opposed to a disk;
   a ramp member located at a position outside the disk;
   a head actuator member supporting the head slider, said head actuator member following a predetermined path when the head actuator member swings around a support shaft so as to get released from the ramp member;
   a lever supported on a first shaft for swinging movement;
   a weight supported on the first shaft for connection to the lever, said weight getting closer to the head actuator member based on swinging movement around the first shaft in a first direction;
   a restriction member designed to prevent the swinging movement of the weight around the first shaft in a second direction opposite to the first direction; and
   a swinging member supported on a second shaft for swinging movement, said swinging member being contacted with the lever swinging around the first shaft so that the swinging member gets into the predetermined path of the head actuator member through the swinging movement around the second shaft,
   wherein said restriction member comprises first and second contact surfaces designed to simultaneously generate rotation moments in opposite directions around the second shaft based on contact of the lever swinging around the first shaft in the second direction.

2. The disk drive according to claim 1, wherein said restriction member is designed to prevent the swinging movement of the lever around the first shaft in the second direction.

* * * * *